United States Patent
Ito

(10) Patent No.: US 12,071,983 B2
(45) Date of Patent: Aug. 27, 2024

(54) BEARING BOX FOR ROTATING ROLLER, METHOD FOR COOLING BEARING BOX FOR ROTATING ROLLER, STEEL CONTINUOUS CASTING MACHINE, AND STEEL CONTINUOUS CASTING METHOD

(71) Applicant: JFE STEEL CORPORATION, Tokyo (JP)

(72) Inventor: Shinya Ito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 140 days.

(21) Appl. No.: 17/761,761

(22) PCT Filed: Sep. 18, 2019

(86) PCT No.: PCT/JP2019/036545
§ 371 (c)(1),
(2) Date: Mar. 18, 2022

(87) PCT Pub. No.: WO2021/053751
PCT Pub. Date: Mar. 25, 2021

(65) Prior Publication Data
US 2022/0373033 A1   Nov. 24, 2022

(51) Int. Cl.
*F16C 37/00*    (2006.01)
*B22D 11/128*   (2006.01)
*F16C 13/02*    (2006.01)

(52) U.S. Cl.
CPC ........ *F16C 37/007* (2013.01); *B22D 11/1287* (2013.01); *F16C 13/02* (2013.01)

(58) Field of Classification Search
CPC ...... F16C 13/02; F16C 13/022; F16C 33/664; F16C 37/00; F16C 37/007; F16C 2322/12; B22D 11/1287; F16J 15/162
See application file for complete search history.

(56) References Cited

U.S. PATENT DOCUMENTS 3,796,472 A * 3/1974 Fernlund ............... F16C 21/00
                                                      384/126
4,071,073 A * 1/1978 Bollig ............... B22D 11/1287
                                                      164/448
(Continued)

FOREIGN PATENT DOCUMENTS

CN          1771101 A       5/2006
CN         200952533 Y      9/2007
(Continued)

OTHER PUBLICATIONS

Nov. 12, 2019 International Search Report issued in International Application No. PCT/JP2019/036545.
(Continued)

*Primary Examiner* — James Pilkington
(74) *Attorney, Agent, or Firm* — Oliff PLC

(57) ABSTRACT

A bearing box for a rotating roller for supporting or transporting a high-temperature object. The bearing box includes a bearing and seal units disposed therein. A cooling jacket is disposed at an outer periphery of the bearing box so that the cooling jacket covers at least a portion of an axial region of the bearing and at least a portion of an axial region of the seal unit. The cooling jacket has a cooling water inlet and a cooling water outlet, and the bearing box is cooled by cooling water supplied to the cooling jacket through the cooling water inlet.

4 Claims, 2 Drawing Sheets

(56) References Cited

U.S. PATENT DOCUMENTS

| | | | | |
|---|---|---|---|---|
| 5,649,889 | A | * | 7/1997 | Warner, III .............. F16C 13/02 |
| | | | | 164/448 |
| 6,443,624 | B1 | * | 9/2002 | Knepper ................... C21D 1/06 |
| | | | | 384/465 |
| 7,325,586 | B2 | * | 2/2008 | Deibl ................. B22D 11/1287 |
| | | | | 164/448 |
| 7,926,547 | B2 | * | 4/2011 | Poeppl ............... B22D 11/1287 |
| | | | | 164/448 |
| 2006/0183614 | A1 | | 8/2006 | Brotzki et al. |

FOREIGN PATENT DOCUMENTS

| | | | |
|---|---|---|---|
| CN | 102695889 A | | 9/2012 |
| CN | 107511466 A | | 12/2017 |
| DE | 102016224761 A1 | † | 6/2017 |
| JP | S51-20023 A | | 2/1976 |
| JP | S6410353 U | | 1/1989 |
| JP | H09-294351 A | | 11/1997 |
| JP | H10-274247 A | | 10/1998 |
| JP | H11-41861 A | | 2/1999 |
| JP | 2003-290891 A | | 10/2003 |
| JP | 2004-148407 A | † | 5/2004 |
| JP | 2006-35236 A | | 2/2006 |
| JP | 2006 035236 A | † | 2/2006 |
| JP | 2006-118600 A | | 5/2006 |
| KR | 10-2012-0095771 A | | 8/2012 |
| KR | 10-1467864 B1 | | 12/2014 |
| SU | 406050 A1 | | 11/1973 |
| WO | 97/23689 A1 | | 7/1997 |
| WO | 2011/065882 A1 | | 6/2011 |

OTHER PUBLICATIONS

Jun. 24, 2022 Extended European Search Report issued in European Patent Application No. 19945586.6.

Aug. 26, 2022 Office Action issued in Russian Patent Application No. 2022106855.

Jan. 10, 2023 Office Action issued in Japanese Patent Application No. 2021-546105.

Feb. 28, 2024 Office Action issued in Korean Patent Application No. 10-2022-7008157.

Jun. 21, 2024 Office Action issued in Chinese Patent Application No. 201980100297.X.

\* cited by examiner
† cited by third party

BEARING BOX FOR ROTATING ROLLER, METHOD FOR COOLING BEARING BOX FOR ROTATING ROLLER, STEEL CONTINUOUS CASTING MACHINE, AND STEEL CONTINUOUS CASTING METHOD

CROSS-REFERENCE TO RELATED APPLICATIONS

This application is the U.S. National Phase of PCT/JP2019/036545 filed on Sep. 18, 2019, the entire disclosure of which is incorporated herein by reference.

TECHNICAL FIELD

This application relates to a bearing box for a rotating roller used in a high-temperature environment generated by, for example, radiant heat, such as a bearing box that supports a cast-slab supporting roller of a continuous casting machine while the cast-slab supporting roller is rotated, and a method for cooling the bearing box for a rotating roller. The application also relates to a steel continuous casting machine including a rotating roller supported by the bearing box, and a steel continuous casting method using the continuous casting machine.

BACKGROUND

In a continuous casting machine for molten steel, molten steel contained in a tundish is poured into a mold, and a cast slab is continuously pulled out of the mold. The cast slab has an outer shell composed of a solidifying shell formed when the molten steel poured into the mold comes into contact with the mold, and unsolidified molten steel provided in an inner region of the cast slab. The cast slab pulled out of the mold is supported by cast-slab supporting rollers disposed below the mold, and surfaces of the cast slab are cooled with cooling water so that the cast slab is solidified to the center in the thickness direction thereof. Then, the cast slab is cut to a predetermined length to produce a material for hot rolling.

The surface temperature of the cast slab in the continuous casting machine is 500° C. or more, and is as high as 900° C. or more in a region immediately below the mold. Therefore, bearing boxes that support the cast-slab supporting rollers while the cast-slab supporting rollers are rotated are exposed to a high-temperature atmosphere, and there is a risk that bearings will be damaged due to breakage of oil packings for sealing lubricating oil in the bearing boxes. Thus, breakage of the oil packings leads to rotation failures of the cast-slab supporting rollers. When the cast-slab supporting rollers are unable to rotate, there is a possibility that the surface of the cast slab will be flawed, centerline segregation in the cast slab will be increased, or break-out of the cast slab will occur. If a roller bearing for a conveying roller table disposed in a downstream section of the continuous casting machine is damaged, the cast slab cannot be delivered, and the continuous casting operation needs to be stopped.

Accordingly, methods for cooling a bearing box to prevent damage to a bearing disposed therein have been proposed. For example, Patent Literature 1 proposes a method for cooling a bearing box by forming a plurality of cooling water grooves in an outer peripheral surface of a housing of a portion of the bearing box, placing a cover that covers the cooling water grooves, and introducing cooling water through the cooling water grooves covered with the cover.

Patent Literature 2 proposes a method for cooling a bearing box for a roller of a roller table included in a continuous casting machine by covering the bearing box with a jacket having an inlet and an outlet for cooling air and introducing cooling air into the jacket.

CITATION LIST

Patent Literature

PTL 1: Japanese Unexamined Patent Application Publication No. 10-274247
PTL 2: Japanese Unexamined Patent Application Publication No. 2003-290891

SUMMARY

Technical Problem

However, the above-described related art has the following problems.

According to the method of Patent Literature 1, the plurality of cooling water grooves are formed in the outer peripheral surface of the housing, and the cooling water grooves are covered with the cover. Therefore, the cooling water grooves can only be formed in the outer peripheral surface of the housing that can be covered with the cover, and the bearing and an oil seal cannot be covered with the cooling water grooves over the entire widths thereof. Therefore, when the outer periphery of the housing receives radiant heat over the entire area thereof, the bearing and the oil seal cannot be shielded from heat transmitted thereto, and degradation of lubricating oil or breakage of an oil packing may occur.

According to the method of Patent Literature 2, the bearing and the oil seal can be cooled over the entire widths thereof by increasing the region in which the jacket for introducing the cooling air is installed. However, sufficient cooling effect cannot be obtained because the cooling medium is cooling air.

The disclosed embodiments have been made in light of the above-described circumstances, and an object of the disclosed embodiments is to provide a bearing box for a rotating roller and a method for cooling the bearing box for a rotating roller with which a bearing and an oil seal can be efficiently cooled with cooling water. It is also an object of the disclosed embodiments to provide a steel continuous casting machine including a rotating roller supported by the bearing box and a steel continuous casting method using the continuous casting machine.

Solution to Problem

The gist of the disclosed embodiments for achieving the above-described objects is as follows:

[1] A bearing box for a rotating roller for supporting or transporting a high-temperature object, the bearing box having a bearing and a seal unit disposed therein, wherein a cooling jacket is disposed at an outer periphery of the bearing box so that the cooling jacket covers at least a portion of an axial region of the bearing and at least a portion of an axial region of the seal unit, wherein the cooling jacket has a cooling water inlet and a cooling water outlet, and wherein the bearing box is cooled by cooling water supplied to the cooling jacket through the cooling water inlet.

[2] The bearing box for a rotating roller according to [1], wherein a portion of the cooling jacket disposed at an outer periphery of the axial region of the seal unit is at least partially disposed on a radially inner side of a portion of the cooling jacket disposed at an outer periphery of the axial region of the bearing.

[3] A method for cooling a bearing box for a rotating roller for supporting or transporting a high-temperature object, the bearing box having a bearing and a seal unit disposed therein, the method including:

placing a cooling jacket at an outer periphery of the bearing box so that the cooling jacket covers at least a portion of an axial region of the bearing and at least a portion of an axial region of the seal unit;

cooling the bearing box by introducing cooling water into the cooling jacket through a cooling water inlet provided in the cooling jacket; and discharging the cooling water that has cooled the bearing box through a cooling water outlet provided in the cooling jacket.

[4] The method for cooling the bearing box for a rotating roller according to [3], wherein a portion of the cooling jacket disposed at an outer periphery of the axial region of the seal unit is at least partially disposed on a radially inner side of a portion of the cooling jacket disposed at an outer periphery of the axial region of the bearing.

[5] A steel continuous casting machine, wherein a cast slab is supported or guided by one or more rotating rollers, each of which is supported by the bearing disposed in the bearing box for a rotating roller according to [1] or [2].

[6] A steel continuous casting method including:

continuously casting a steel slab by using the steel continuous casting machine according to [5].

Advantageous Effects

According to the disclosed embodiments, most part of the outer periphery of the bearing box is covered with the cooling water. Therefore, transmission of radiant heat to the bearing and the seal unit can be blocked. Accordingly, even when the bearing for a rotating roller is used in a high-temperature environment, degradation of lubricating oil or an oil packing can be prevented, and the function of the bearing for the rotating roller can be maintained.

DETAILED DESCRIPTION

Figure 1:
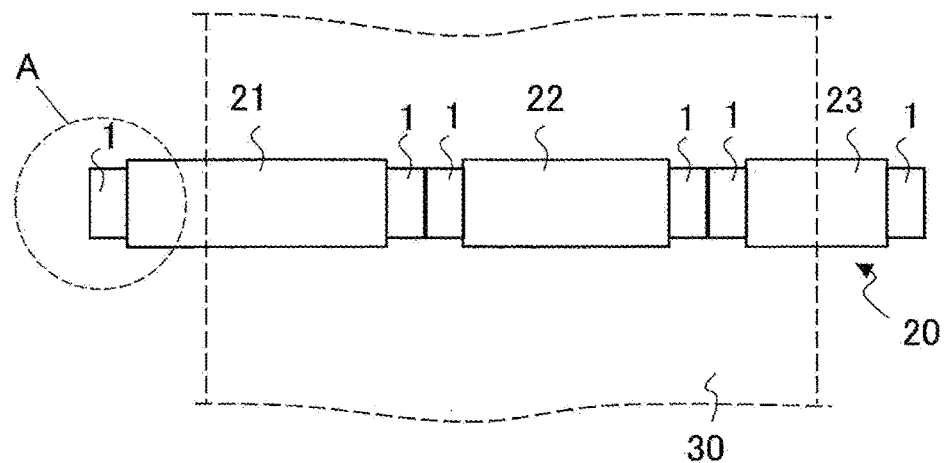
FIG. 1 is a schematic diagram illustrating an example of a cast-slab supporting roller included in a continuous casting machine.
Figure 2:
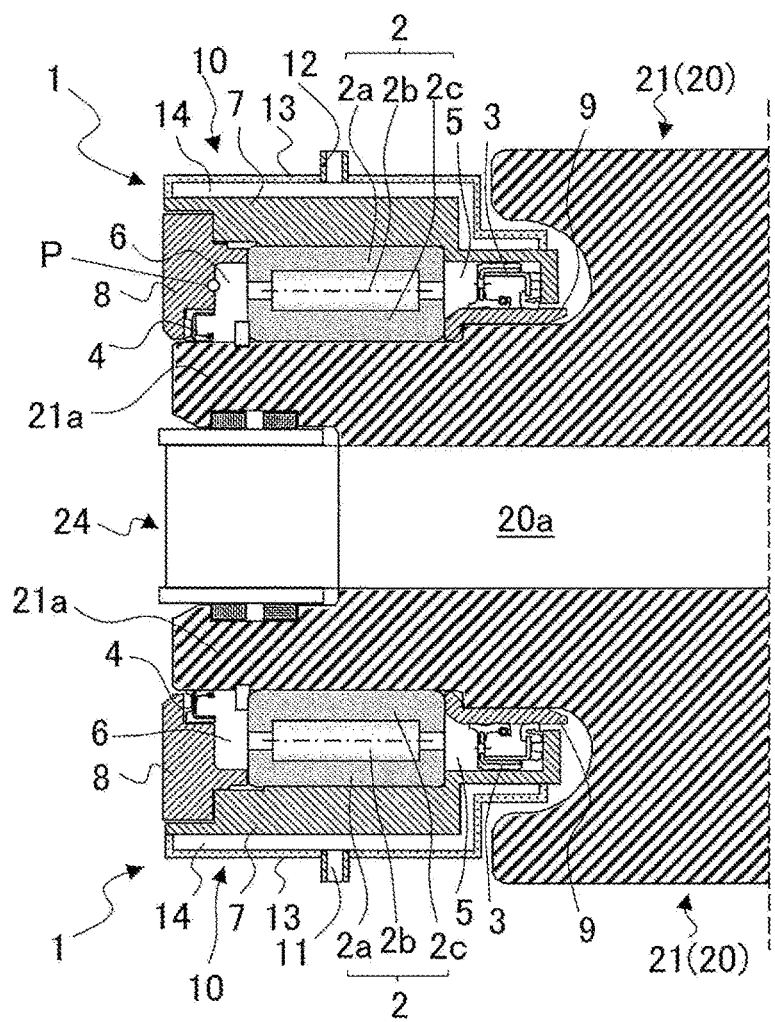
FIG. 2 is an enlarged view of part A in FIG. 1.

A bearing box for a cast-slab supporting roller included in a continuous casting machine for a steelmaking process in a steel works will now be described with reference to the accompanying drawings as an example of a bearing box for a rotating roller for supporting or transporting a high-temperature object according to the disclosed embodiments. FIG. 1 is a schematic diagram illustrating an example of a cast-slab supporting roller included in a continuous casting machine for a steelmaking process. FIG. 2 is an enlarged view of part A in FIG. 1.

The continuous casting machine (not illustrated) for the steelmaking process, in which a steel cast slab is produced by continuously casting molten steel, includes cast-slab supporting rollers 20 that serve as rotating rollers in a region from a position immediately below a mold to an end of the continuous casting machine. The cast-slab supporting rollers 20, which are referred to as support rollers, guide rollers, or pinch rollers, are arranged in a casting direction so as to face each other with a cast slab 30 disposed therebetween. The cast-slab supporting roller 20 illustrated in FIG. 1 is used as a guide roller and has a three-piece structure including three rollers, which are an A roller 21, a B roller 22, and a C roller 23.

Bearing boxes 1 having bearings therein are provided on roll chocks at both ends of each roller, and each bearing box 1 is fixed to a frame of a guide roller segment (not illustrated). Thus, the A roller 21, the B roller 22, and the C roller 23 are supported by the bearings disposed in the bearing boxes 1 while being in contact with the cast slab 30, and are thereby configured to rotate individually. The cast-slab supporting roller 20 illustrated in FIG. 1 is an internally water cooled rotating roller.

The structure of the bearing box 1 on the left side of the A roller 21 in the figure will now be described as an example of the structure of the bearing boxes 1. The bearing boxes 1 all have the same structure.

As illustrated in FIG. 2, a bearing 2 composed of an outer ring 2a, rollers 2b, and an inner ring 2c is provided on a roll chock 21a of the A roller 21. A peripheral housing 7 is provided at the outer periphery of the bearing 2. A side housing 8 is attached to one side surface of the bearing 2 (side surface that does not face a cross section of the A roller 21), and a fixed housing 9 is attached to the other side surface (side surface that faces the cross section of the A roller 21). The bearing 2 is fixed to the roll chock 21a at a predetermined position by the above-described three housings. The peripheral housing 7 is formed to partially cover the side surface of the bearing 2 that faces the cross section of the A roller 21, and an end of a portion of the peripheral housing 7 that partially covers the side surface of the bearing 2 faces the fixed housing 9 with a predetermined interval therebetween.

An oil packing 3 is disposed adjacent to the bearing 2 at a location that is surrounded by the peripheral housing 7 and the fixed housing 9 and at which the peripheral housing 7 and the fixed housing 9 face each other, and an oil seal 5 is formed of the oil packing 3. An oil packing 4 is disposed adjacent to the bearing 2 at a location that is surrounded by the side housing 8 and the roll chock 21a and at which the side housing 8 and the roll chock 21a face each other, and an oil seal 6 is formed of the oil packing 4. The bearing 2 is constantly impregnated with lubricating oil by the oil packing 3 and the oil packing 4. In this specification, the structure composed of the oil packing 3 and the oil seal 5 and the structure composed of the oil packing 4 and the oil seal 6 are referred to as "seal units".

As described above, the bearing box 1 includes the bearing 2, the peripheral housing 7, the side housing 8, the fixed housing 9, the oil packing 3, the oil packing 4, the oil seal 5, and the oil seal 6. In FIG. 2, reference sign 20a denotes a flow passage for roller cooling water that cools the interior of the cast-slab supporting roller 20, and 24 denotes a jig for supply and discharge of the roller cooling water.

The bearing box 1 has a cooling jacket 10 provided on the outer periphery of the peripheral housing 7. The cooling jacket 10 covers a region in which the bearing 2, the oil packing 3, the oil seal 5, the oil packing 4, and the oil seal 6 are disposed. The cooling jacket 10 has a water passage 14 through which cooling water flows. Although the material of the cooling jacket 10 is not particularly limited, the cooling jacket 10 is preferably made of a metal, such as stainless steel or carbon steel, because the cooling jacket 10 receives radiant heat.

The cooling jacket 10 has a cooling water inlet 11 and a cooling water outlet 12. The outer periphery of the peripheral housing 7 is cooled by the cooling water that is introduced from a cooling water supply pipe (not illustrated) through the cooling water inlet 11, caused to flow through the water passage 14, and discharged through the cooling water outlet 12. Accordingly, it is structured that radiant heat from the cast slab 30 is not transmitted to the bearing 2, the oil packing 3, the oil seal 5, the oil packing 4, and the oil seal 6.

As illustrated in FIG. 2, in response to the cross sectional shape of the end portion of the A roller 21, the cooling jacket 10 is formed such that a portion thereof that covers an axial region of the seal unit composed of the oil packing 3 and the oil seal 5 is disposed on the radially inner side of a portion thereof that covers an axial region of the bearing 2.

The cooling water discharged through the cooling water outlet 12 may be caused to flow downward along the outer periphery of the cooling jacket 10, or be discharged to a cooling water discharge pipe (not illustrated). To shield the radiant heat from the cast slab 30, the cooling water is preferably caused to flow downward along the outer periphery of the cooling jacket 10 so that the cooling jacket 10 is also cooled from the outer periphery thereof.

In the bearing box 1 illustrated in FIG. 2, the cooling jacket 10 extends over the entire axial region of the bearing 2 and the entire axial region of each seal unit. However, the cooling jacket 10 is not limited to this form. In other words, the cooling jacket 10 may be disposed at the outer periphery of the bearing box 1 so as to extend over at least a portion of the axial region of the bearing 2 and at least a portion of the axial region of each seal unit.

In the bearing box 1 illustrated in FIG. 2, the cooling water inlet 11 and the cooling water outlet 12 are directly connected to a cover 13 that constitutes the outer periphery of the cooling jacket 10. However, the manner in which the cooling water inlet 11 and the cooling water outlet 12 are attached to the cooling jacket 10 is not limited to this form. For example, the cooling water may instead be supplied and discharged through a water passage formed in the bearing box 1.

As described above, according to the bearing box for a rotating roller and the method for cooling the bearing box for a rotating roller of the disclosed embodiments, most part of the outer periphery of the bearing box 1 is covered with the cooling water. Therefore, transmission of the radiant heat to the bearing 2 and the oil seals 5 and 6 can be blocked. Accordingly, even when the bearing 2 is used in a high-temperature environment, degradation of the lubricating oil or the oil packings 3 and 4 can be prevented, and the function of the bearing 2 can be maintained.

In the above description, the disclosed embodiments are applied to the bearing box 1 for the cast-slab supporting roller 20 of the continuous casting machine. However, the disclosed embodiments may be applied to a bearing box for any rotating roller that is exposed to a high-temperature environment generated by, for example, radiant heat, and the use of the bearing box is not limited in the disclosed embodiments. The internal structure of the bearing box is also not limited to that described above, and the disclosed embodiments may be applied to any bearing box in which a so-called "bearing" is disposed.

EXAMPLES

Example 1

A test was performed in which a bearing box for a cast-slab supporting roller (guide roller) of a continuous casting machine for producing a steel cast slab by a continuous casting method was cooled with cooling water. The continuous casting machine that was used was a vertical bending type slab continuous casting machine with the following specifications: vertical portion 3.0 m, 10-point bending (upper bending zone), curvature radius of curved portion 10.5 m, 6-point straightening (lower straightening zone), and machine length 49.2 m. The continuous casting machine was capable of producing a cast slab with a thickness of 220 mm and a width of 675 mm to 2100 mm. The bearing box that was tested was a bearing box for a cast-slab supporting roller for supporting the cast slab with a surface temperature of 700° C. to 900° C. The bearing box contained a bearing (rolling bearing) having an outer diameter of 170 mm, an inner diameter of 110 mm, and a width of 43 mm.

The test was performed on the bearing box according to the disclosed embodiments illustrated in FIG. 2, and was also performed on the bearing box proposed in Patent Literature 1 for comparison. The temperatures in the bearing boxes were measured during continuous casting, and the measured temperatures were compared.

Figure 3:
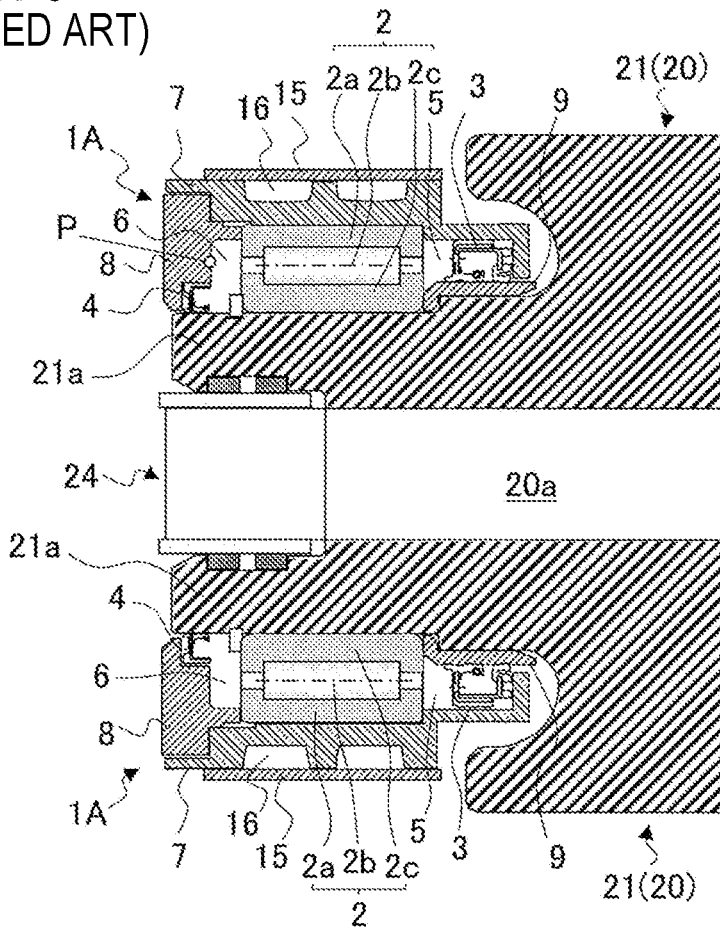
FIG. 3 is a diagram illustrating an example of a bearing box proposed in Patent Literature 1.

FIG. 3 illustrates an example of the bearing box proposed in Patent Literature 1. Referring to FIG. 3, a bearing box 1A proposed in Patent Literature 1 includes a peripheral housing 7 having a plurality of cooling water grooves 16 in the outer periphery thereof, and the cooling water grooves 16 are covered with a cover 15. Cooling water is caused to flow through the cooling water grooves 16 covered with the cover 15, so that the outer periphery of the peripheral housing 7 is water-cooled. Other structures of the bearing box 1A illustrated in FIG. 3 are the same as those of the bearing box 1 illustrated in FIG. 2. The same elements are denoted by the same reference signs, and description thereof is omitted.

The bearing box 1 of the disclosed embodiments illustrated in FIG. 2 (hereinafter referred to also as "Example") and the bearing box 1A for comparison illustrated in FIG. 3 (hereinafter referred to also as "Comparative Example") were cooled by introducing cooling water into each of the water passage 14 and the cooling water grooves 16 of the bearing box 1 and the bearing box 1A, respectively, at a rate of 15 L per minute. For both of the bearing box 1 according to the Example and the bearing box 1A according to the Comparative Example, the cooling water used to cool the bearing box 1 and the bearing box 1A was caused to flow down along the outer peripheries of the bearing boxes.

Figure 4:
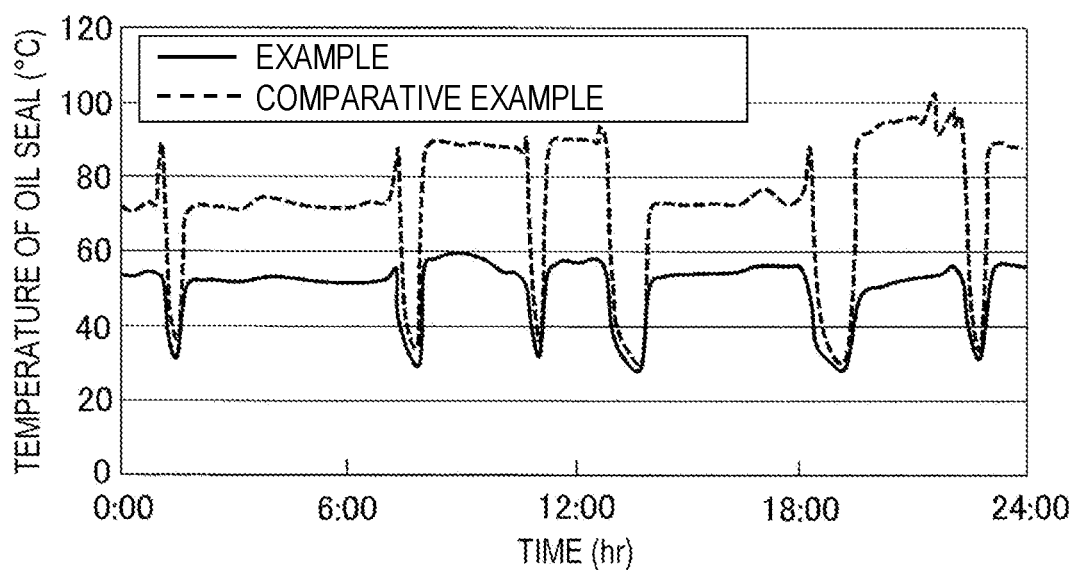
FIG. 4 is a graph showing the result of a measurement in which the temperature of a portion of an oil seal in a bearing box that is adjacent to a side housing is measured with a sheathed thermocouple during one day of continuous casting operation.

FIG. 4 shows the result of a measurement in which the temperature of a portion of the oil seal 6 denoted by "P" in FIGS. 2 and 3 that is adjacent to the side housing 8 was measured with a sheathed thermocouple during one day of continuous casting operation. In FIG. 4, periods in which the temperature is temporarily reduced are periods between continuous casting operations in which continuous casting is not performed. Other periods are periods in which continuous casting (continuous-continuous casting) of molten steel is performed.

As illustrated in FIG. 4, according to the Example, the temperature of the portion of the oil seal 6 during continuous casting is lower by 20° C. to 40° C. compared to that in the Comparative Example. Thus, it has been verified that the influence of the radiant heat from the cast slab on the oil seal 6 can be reduced.

In the Comparative Example, a region in which the oil seal 5 is disposed is not covered with the cover 15. In contrast, in the Example, the region in which the oil seal 5 is disposed is also covered with the cooling jacket 10. The temperatures in these regions were determined by temperature analysis. As result, it has been verified that according to the Example, the temperature in the region in which the oil seal 5 is disposed is lower by about 70° C. to 80° C. compared to that in the Comparative Example.

Example 2

The vertical bending type slab continuous casting machine used in Example 1 was used to cast steel into a slab having a surface temperature of 700° C. to 900° C. At 800° C., in particular, the cast slab had a minimum ductility, in other words, the possibility of formation of surface cracks in the cast slab was high. The width of the cast slab to be produced was 2100 mm, which was the maximum width of the continuous casting machine. In a lower straightening zone of the slab continuous casting machine, when viewed from an upstream side toward a downstream side of the strand, bearing boxes disposed near a left end portion of the cast slab in the width direction were each composed of the bearing box proposed in Patent Literature 1 illustrated in FIG. 3 (bearing box of the Comparative Example), and bearing boxes disposed near a right end portion of the cast slab in the width direction were each composed of the bearing box according to the Example illustrated in FIG. 2. In the lower straightening zone of the vertical bending type slab continuous casting machine, there is a possibility that the surfaces of the cast slab will be distorted and cracks will be formed therein.

The bearing boxes were arranged in the above-described manner, and a continuous casting operation of level A was performed in which the amount of secondary cooling water supplied before the cast slab reached the lower straightening zone was adjusted so that the surface temperature of the cast slab was in the range of 700° C. to 900° C., which includes 800° C. at which the possibility of formation of surface cracks was high. In addition, a continuous casting operation of level B was performed in which the amount of secondary cooling water supplied before the cast slab reached the lower straightening zone was adjusted so that the surface temperature of the cast slab was in the range of 900° C. to 1000° C. in the lower straightening zone.

Continuous casting of 10 heats of molten steel with a chemical composition of [C]: 0.03 to 0.05 mass %, [Si]: 0.25 to 0.35 mass %, [Mn]: 1.3 to 1.4 mass %, [P]: 0 to 0.015 mass %, and [S]: 0 to 0.002 mass % was performed for each of level A and level B. The mass of the molten steel was 245 tons per heat.

After the continuous casting, the surface of the cast slab was scarfed to a depth of 2 mm over the entire area thereof, and the number of surface cracks (3 mm or more in length) in the cast slab was counted. The cast slab obtained by the operation of level A had 3.4 surface cracks per 1 m along the length thereof. In contrast, the cast slab obtained by the operation of level B had no surface cracks with a length of 3 mm or more.

The appearances of the bearing boxes in the lower straightening zone were observed immediately after the above-described continuous casting test. As a result, no abnormality was found in particular for the bearing boxes according to the Example. In contrast, the bearing boxes according to the Comparative Example had surfaces whose colors had been changed due to the temperature increase, and some of the bearing boxes had scales formed on the cast slab fixed thereto.

The invention claimed is:

1. A bearing box for a rotating roller for supporting or transporting a high-temperature object, the bearing box comprising:
    a bearing and a seal unit disposed therein; and
    a cooling jacket having a cooling water inlet and a cooling water outlet, the cooling jacket being disposed at an outer periphery of the bearing box so that the cooling jacket covers at least a portion of an axial region of the bearing and at least a portion of an axial region of the seal unit,
    wherein the bearing box is cooled by cooling water supplied to the cooling jacket through the cooling water inlet, and
    wherein a portion of an outer periphery of the cooling jacket disposed at an outer periphery of the axial region of the seal unit is at least partially disposed on a radially inner side of a portion of an outer periphery of the cooling jacket disposed at an outer periphery of the axial region of the bearing.

2. A steel continuous casting machine, wherein a cast slab is supported or guided by one or more rotating rollers, each of which is supported by a bearing disposed in a bearing box according to claim 1.

3. A steel continuous casting method comprising continuously casting a steel slab by using a steel continuous casting machine according to claim 2.

4. A method for cooling a bearing box for a rotating roller for supporting or transporting a high-temperature object, the bearing box comprising a bearing and a seal unit disposed therein, the method comprising:
    placing a cooling jacket at an outer periphery of the bearing box so that the cooling jacket covers at least a portion of an axial region of the bearing and at least a portion of an axial region of the seal unit;
    cooling the bearing box by introducing cooling water into the cooling jacket through a cooling water inlet provided in the cooling jacket; and
    discharging the cooling water that has cooled the bearing box through a cooling water outlet provided in the cooling jacket,
    wherein a portion of an outer periphery of the cooling jacket disposed at an outer periphery of the axial region of the seal unit is at least partially disposed on a radially inner side of a portion of an outer periphery of the cooling jacket disposed at an outer periphery of the axial region of the bearing.

* * * * *